W. B. HAYDEN.

BALE-TIE.

No. 7,471. Reissued Jan. 23, 1877.

WITNESSES:
Emil Kiesewetter
Hiram L. Jones

INVENTOR:
William B. Hayden

THE NORRIS PETERS CO., PHOTO-LITHO., WASHINGTON, D. C.

UNITED STATES PATENT OFFICE.

WILLIAM B. HAYDEN, OF COLUMBUS, OHIO.

IMPROVEMENT IN BALE-TIES.

Specification forming part of Letters Patent No. 179,654, dated July 11, 1876; reissue No. 7,471, dated January 23, 1877; application filed January 17, 1877.

*To all whom it may concern:*

Be it known that I, WILLIAM B. HAYDEN, of Columbus, in the county of Franklin and State of Ohio, have invented a new and useful Improvement in Cotton and other Baling Ties and Hoops or Bands; and I do hereby declare that the following is a full, clear, and exact description thereof, reference being had to the accompanying drawings, forming part of this specification, in which—

Figure 1:
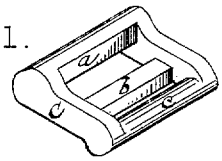
Figure 2:
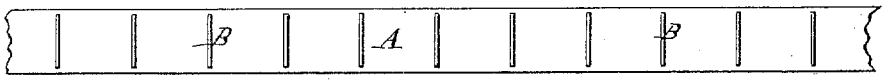
Figure 3:
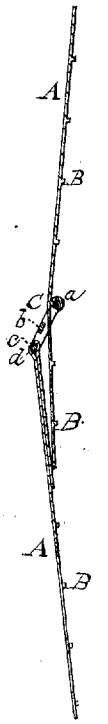
Figure 5:
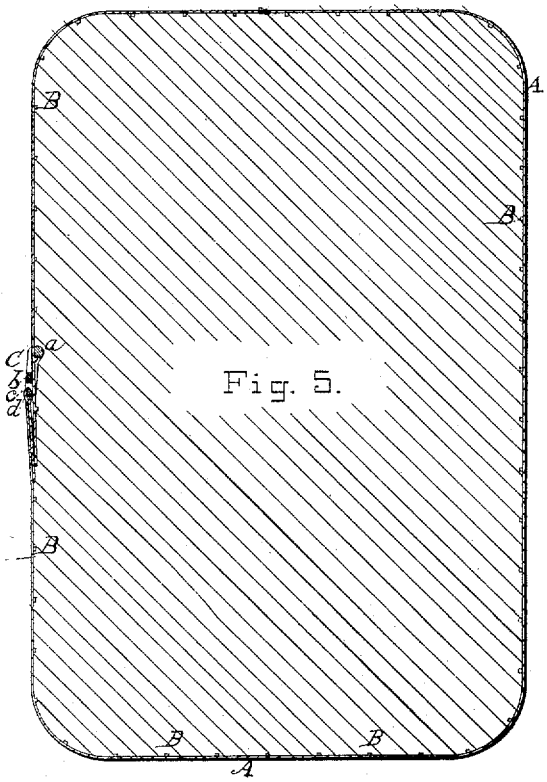
Figure 4:
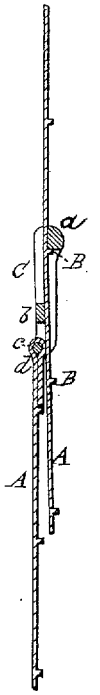

Figure 1 is a perspective view of the fastening clasp or loop of the hoop or band. Fig. 2 is an inside face view of the hoop or band. Fig. 3 is a longitudinal section of the fastening clasp or loop and the band. Fig. 4 is a similar section to Fig. 3, the parts being shown as when fastened around a bale. Fig. 5 shows a section of a bale with the improved fastening locking a toothed hoop around a bale.

The nature of my invention in this application consists in the combination of a metallic clasp or loop containing a pawl with a metallic bale hoop or band, having projecting teeth raised transversely across one face at proper intervals, which serve as fastening and holding devices.

To enable others skilled in the art to understand my invention I will proceed to describe the same.

In the drawings, A represents the metallic band or hoop, and B B transverse teeth formed on one side at proper intervals. The clasp or loop C is made of metal, with cross-bars, as shown at *a b c*. The bar *c* I prefer to make round, for the purpose of looping around it one end of the toothed strap or hoop, leaving such bar free to turn in the looped hoop end. The bar *a* should be so shaped as to admit of the free and easy passage over it of the other end of the toothed strap or hoop, and under bars *b* and *c*. This bar *a* is also so shaped, by flattening or otherwise, as to make a right or acute angle at the proper point, to serve the purpose of a catch or pawl to the toothed hoop, when such toothed hoop is passed into the clasp or loop and over such pawl, thereby admitting the free passage of the toothed hoop into the clasp or loop, but retaining it and preventing it from being drawn back or out, and thus forming a perfect lock and fastener to the two ends of metallic-toothed bale-ties, whether applied to the baling of elastic or non-elastic substances. With the devices of the catch or pawl in the clasp or loop C, and the teeth on one side of the metallic hoop, the hoop or band is firmly locked just at the point desired, or at which it is adjusted by the operator, and will not yield or slip out when used on bales which tend to expand after being compressed. By this arrangement the time required to loop the end of the strap in baling is saved; also, the stretch in tightening a loop does not occur. Baling is more rapidly performed and greater compactness attained by passing the end straight into the clasp or loop, and retaining it just at the point where it is left by the operator than by looping it.

The bar *b* may or may not be used. If used, it should be so placed and shaped with reference to bar *a* as to admit of the free and easy passage of the toothed hoop or band, with the teeth facing inward over bar *a* and under bars *b* and *c*, so as not to bend the end out of line by contact with the bale, between which and the bar *c* it is passe If the bar *b* is not used, the bar *c* is brought nearer to the bar *a*; in other words, the bar *c* is then in the position now occupied by the bar *b*, but the operation of the device is in no wise different.

In practice, I first connect the clasp or loop C with one end of the hoop (teeth facing inward) around the round bar *c*. The looped end may be secured by rivets or clamps. The other end is then passed (teeth facing inward) into the clasp or loop C, over the bar *a* and under the bar *c*, and also under *b*, if *b* is used, drawing the hoop as tight as possible, at which point it will be held, retained, and fastened, and prevented from slipping, whether applied to bales of elastic or non-elastic substances by the devices of the teeth on the hoop and the catch or pawl in the clasp or loop.

The band or hoop, when in use, has its toothed side placed in contact with the bale.

The teeth, when so placed, tend to prevent the band or hoop from slipping or turning on the bale.

Having described my invention, what I claim, and desire to secure by Letters Patent, is—

The combination of a clasp or loop, containing a pawl, with a metallic hoop or band containing teeth, into which teeth the said pawl locks in baling any elastic or non-elastic substances, substantially as described.

WILLIAM B. HAYDEN.

Witnesses:
CHAS. BAKER,
HIRAM L. JONES.